Jan. 19, 1960 E. R. ROUT 2,922,038

CIRCUITS FOR QUANTISING THE WAVEFORMS OF ELECTRIC SIGNALS

Filed Feb. 27, 1956

INVENTOR
Eric R. Rout
BY
Ralph B. Stewart
ATTORNEY

United States Patent Office 2,922,038

Patented Jan. 19, 1960

2,922,038

CIRCUITS FOR QUANTISING THE WAVEFORMS OF ELECTRIC SIGNALS

Eric Raymond Rout, Lower Kingswood, England, assignor to Marconi's Wireless Telegraph Company Limited and Standard Telephone & Cables Limited, both of London, England Application February 27, 1956, Serial No. 567,928

Claims priority, application Great Britain March 11, 1955

4 Claims. (Cl. 250—27)

Figure 1:
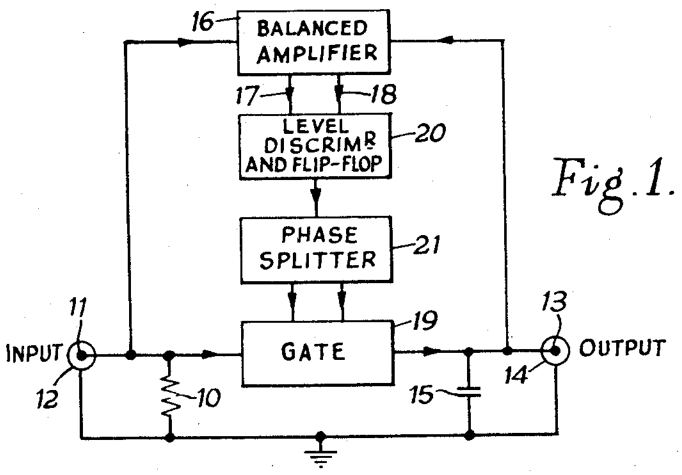

The present invention relates to circuits for quantising electric signal waveforms. Quantised waveforms are needed for many purposes, such as the transmission of signals of complex waveform, for example speech or television signals, in a reduced bandwidth of frequency.

As is known, the signal at the output of a quantising circuit is capable of assuming only a limited number of predetermined amplitude levels, and each amplitude level in the input signal is represented in the output signal by the one of the predetermined levels nearest thereto.

Devices that have been used heretofore for input signals of a periodic and rapidly fluctuating nature have included a cathode ray tube together with suitable scanning and masking arrangements and a photo-electric cell in which the signal output from the photocell is caused to vary in steps or quantum levels according to the position of the spot and the transparency of the mask at that point. Other such devices have included amplitude limiters or multivibrator circuits equal in number to the number of the predetermined levels. These circuits are simultaneously supplied with the input signal, and their outputs are combined in such a fashion that, as the input signal changes in level the output signal jumps from one level to the next as an additional valve becomes fully conducting or nonconducting, depending upon the polarity of the input signal change. Where a large number of output levels is desired, such as in a television application where thirty is a typical number, this type of device becomes exceedingly complicated and difficult to adjust and operate. Moreover these known devices suffer from the disadvantage that they will produce changes of quantum level due to a small amount of random noise associated with the input signal when the level of the input signal is close to a critical level at which the output will change from one level to the next.

The present invention has for its object to provide a quantising circuit which is simpler and cheaper than those referred to, but is nevertheless reliable in operation and has the advantage that the output signal remains substantially constant in amplitude at all times at one of the predetermined levels except when there occurs a change of predetermined magnitude, corresponding to one whole quantum step, in the amplitude of the input signal.

According to the present invention main input terminals to which signals to be quantised are applied, are coupled to main output terminals through a gating device, and there are provided means for maintaining the signal amplitude at the output terminals substantially constant during times when the gating device is closed or is nonconductive, a differentially responsive device having two input terminals coupled to the main input and output terminals respectively and adapted to produce an output in dependence upon the difference between the signal amplitudes at its two input terminals, and means adapted to generate and apply a gating pulse to the gating device, to open the device (make it conductive), when the said difference exceeds a predetermined value.

Figure 2:
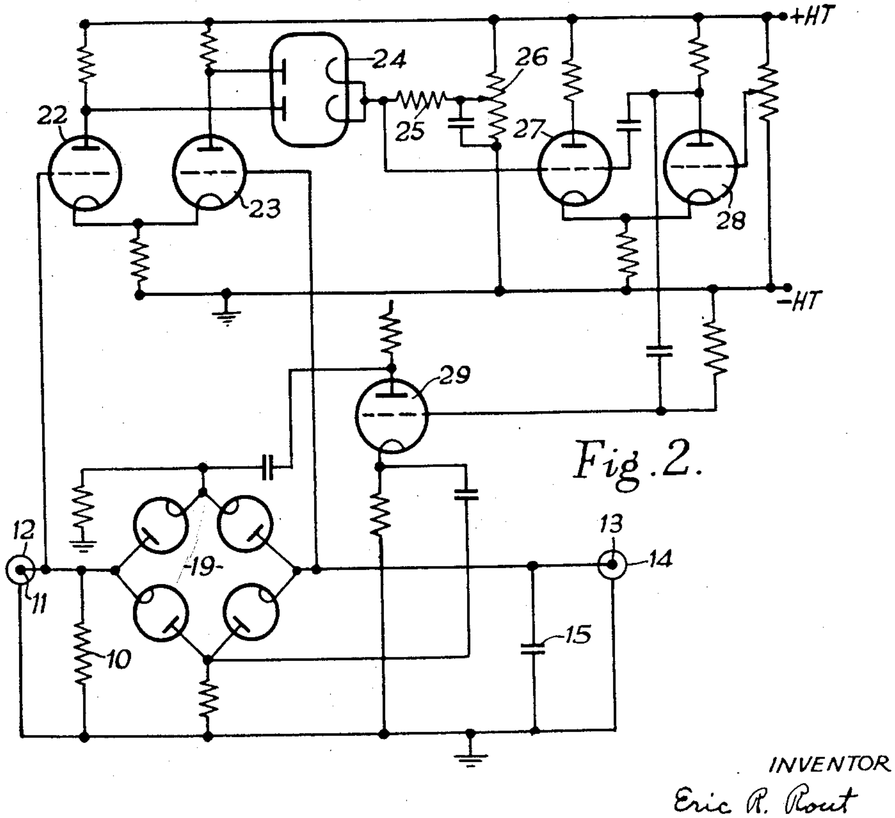

The invention will be described by way of example with reference to the accompanying drawing in which Fig. 1 is a block circuit diagram of one embodiment, and Fig. 2 is a simplified circuit diagram showing how blocks in Fig. 1 may be constituted.

Referring to Fig. 1, an input signal is applied across an input resistor 10 connected between two main input terminals constituted by the inner and outer conductors 11 and 12 of a coaxial cable. Two main output terminals 13 and 14 constituted in like manner have a capacitor 15 connected between them. The outer conductors 12 and 14 of the main input and output are earthed. The inner conductors 11 and 13 are connected respectively to two input terminals of a balanced amplifier 16. So long as the voltages at the two input terminals of this amplifier are substantially equal, the voltages at the two output terminals 17 and 18 of the amplifier will be small. When, however, one of these input voltages exceeds the other, the voltage difference will be powerfully amplified and one or other of the output terminals of the amplifier will be driven positive.

Between one main input and one main output terminal 11 and 13 is connected a gating device 19, and suitable means are provided whereby when the positive voltage at either of the output terminals 17 or 18 of the balanced amplifier exceeds a predetermined value, a gating pulse is applied to the gating device 19 which opens this gate, and in effect, connects the main input and output terminals 11 and 13 together. Thus each time the gate is opened the voltage across the capacitor 15 is made equal to that at the main input terminal 11. At other times the voltage across the capacitor remains constant. The voltage across the capacitor 15 is, therefore, changed in steps each time the input and output voltages differ by the predetermined value.

In this embodiment, the aforesaid means for generating the gating pulses comprises a monostable multivibrator or flip-flop 20 so arranged that when either amplifier output terminal 17 or 18 reaches a positive potential exceeding a predetermined value, the one of the two valves of the multivibrator that is normally insulating becomes conducting and the other valve which is normally conducting becomes insulating. When this occurs a pulse is generated and applied to a phase-splitter 21 which generates at its output pulses adapted to open the gate 19. When the output and input voltages have been equalised, the two flip-flop valves return to their normal condition.

As shown in Fig. 2, the balanced amplifier 16 of Fig. 1 is constituted by two valves 22 and 23 connected as a "long-tailed pair." A double diode 24 has its anodes connected respectively to the anodes of the valves 22 and 23 and its cathodes connected through a common resistor 25 to a variable tapping on a potentiometer 26. The circuit 24, 25, 26 constitutes a level discriminator and by adjusting the potentiometer 26 the magnitude of the step in the quantiser can be adjusted.

Whenever the difference between the voltages at the grids of the valves 22 and 23 exceeds a predetermined value, dependent upon the setting of the potentiometer 26, a positive voltage is applied to the multi-vibrator constituted by valves 27 and 28 which is thereby triggered and generates a pulse which is applied to a phase-splitter valve 29. The voltages applied from the valve 29 to the gate 19 open the gate and the voltage across the capacitor 15 then assumes the value of the voltage at the input terminal 11.

I claim:

1. A circuit for quantising an electric signal waveform comprising a main input terminal for the signal to be quantised, a main output terminal for the quantised signal, a normally closed gating device connected between said input and output terminals, signal-maintaining means consisting of an unbypassed condenser having negligible leakage connected to said output terminal and maintaining the signal amplitude at said output terminal substantially constant when said gating device is closed, a differentially responsive device having two input terminals coupled to the main input and output terminals respectively and responsive to a difference between the signal amplitudes at its two input terminals exceeding a predetermined value when the amplitude at either terminal exceeds that at the other to generate an output voltage, and means applying said output voltage to open said gating device and thereby to connect said input to said output terminal.

2. A circuit for quantising an electric signal waveform comprising main input and output terminals, a gating device connected between said input and output terminals, signal-maintaining means connected to said output terminals and maintaining the signal amplitude at said output terminals substantially constant when said gating device is closed, an amplitude level discriminator having two input terminals coupled to the main input and output terminals respectively and responsive to a difference between the signal amplitudes at its two input terminals to generate an output voltage, a monostable multivibrator coupled to said discriminator and generating a gating pulse in response to said output voltage exceeding a predetermined voltage, and means coupling said multivibrator to said gating device to apply said gating pulse to open said gating device.

3. A circuit for quantizing an electrical signal waveform comprising an input terminal for the signal, an output terminal for deriving the quantized signal, a circuit including a normally open switch between the input and output terminals, means consisting of an unbypassed condenser having negligible leakage connected to the output terminal for storing the signal and maintaining its amplitude, means for comparing the amplitudes of the stored and input signals to produce a control voltage when the difference in amplitude exceeds a predetermined value, and means responsive to the control voltage so produced to close said switch and connect the input and output terminals for a time sufficient to substantially equalize the input and output signal voltages.

4. A circuit for quantizing an electric signal waveform, comprising a signal input terminal, a signal output terminal, a normally open switch between the input and output terminals, means consisting of an unbypassed condenser having negligible leakage at the output terminal for storing the signal thereat and maintaining it at constant amplitude while the switch is open, comparator means connected to the input and output terminals for producing a control voltage when the amplitude of the signal at either terminal exceeds that at the other by a predetermined value, said switch being responsive to said control voltage to connect said input and output terminals, and means connecting the output of the comparator to said switch.

References Cited in the file of this patent

UNITED STATES PATENTS

| | | |
|---|---|---|
| 2,403,873 | Mumma | July 9, 1946 |
| 2,449,467 | Goodall | Sept. 14, 1948 |
| 2,510,054 | Alexander et al. | June 6, 1950 |
| 2,617,879 | Sziklai | Nov. 11, 1952 |
| 2,662,118 | Schouten et al. | Dec. 8, 1953 |
| 2,745,064 | Bailey et al. | May 8, 1956 |
| 2,803,702 | Ville et al. | Aug. 20, 1957 |